(12) United States Patent
Lee

(10) Patent No.: US 6,449,025 B2
(45) Date of Patent: *Sep. 10, 2002

(54) MULTI-DOMAIN LIQUID CRYSTAL DISPLAY DEVICE HAVING FIELD AFFECTING ELECTRODE

(75) Inventor: Yun Bok Lee, Anyang (KR)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/357,247

(22) Filed: Jul. 20, 1999

(30) Foreign Application Priority Data

Jul. 23, 1998 (KR) ............................................. 98-29764
Apr. 1, 1999 (KR) ............................................. 99-11389

(51) Int. Cl.[7] ..................... G02F 1/1337; G02F 1/1333; G02F 1/1343; G02F 1/1335
(52) U.S. Cl. ........................ 349/129; 349/138; 349/143; 349/123; 349/117
(58) Field of Search .......................... 349/125, 38, 106, 349/143, 138, 123, 124, 126, 117

(56) References Cited

U.S. PATENT DOCUMENTS

| | | | |
|---|---|---|---|
| 3,914,022 A | 10/1975 | Kashnow | 350/160 CC |
| 4,581,608 A | 4/1986 | Aftergut et al. | 340/704 |
| 4,701,028 A | 10/1987 | Clerc et al. | 350/337 |
| 4,728,175 A | 3/1988 | Baron | 350/336 |
| 4,786,147 A | 11/1988 | Clerc et al. | 350/337 |
| 4,889,412 A | 12/1989 | Clerc et al. | 350/347 E |
| 4,937,566 A | 6/1990 | Clerc | 340/784 |
| 4,978,203 A | 12/1990 | Yamazaki et al. | 350/339 |
| 5,039,185 A | 8/1991 | Uchida et al. | 359/75 |
| 5,042,918 A * | 8/1991 | Suzuki | 359/59 |
| 5,093,741 A | 3/1992 | Shohara et al. | 359/90 |
| 5,182,664 A | 1/1993 | Clerc | 359/93 |
| 5,249,070 A | 5/1993 | Takano | 359/54 |
| 5,229,873 A | 7/1993 | Hirose et al. | 359/55 |
| 5,309,264 A | 5/1994 | Lien et al. | 359/87 |
| 5,339,181 A | 8/1994 | Kim et al. | 359/59 |

(List continued on next page.)

FOREIGN PATENT DOCUMENTS

| | | |
|---|---|---|
| EP | 0 752 611 | 1/1997 |
| EP | 0 814 142 | 12/1997 |
| EP | 0 854 377 | 7/1998 |

(List continued on next page.)

OTHER PUBLICATIONS

A. Lien, R.A. John, Two–Domain TN–LCDs Fabricated by Parallel Fringe Field Method, SID Digest, 1993, pp. 269–272.

(List continued on next page.)

Primary Examiner—William L. Sikes
Assistant Examiner—Tarifur R. Chowdhury
(74) Attorney, Agent, or Firm—McKenna Long & Alridge LLP

(57) ABSTRACT

The present multi-domain liquid crystal display device includes first and second substrates facing each other, a liquid crystal layer between the first and second substrates, a plurality of gate bus lines arranged in a first direction on the first substrate and a plurality of data bus lines arranged in a second direction on the first substrate to define a pixel region, a thin film transistor positioned at a crossing area of the data bus line and the gate bus line and comprising a gate electrode, a semiconductor layer, and source/drain electrodes, a pixel electrode in the pixel region, a subsidiary electrode on the second substrate, a color filter layer on the subsidiary electrode, a common electrode on the color filter layer, and an alignment layer on at least one substrate between the first and second substrates.

40 Claims, 17 Drawing Sheets

U.S. PATENT DOCUMENTS

| | | | | |
|---|---|---|---|---|
| 5,392,145 A | * | 2/1995 | Edwards | 345/43 |
| 5,477,358 A | | 12/1995 | Rosenblatt et al. | 359/77 |
| 5,517,341 A | | 5/1996 | Kim et al. | 359/59 |
| 5,517,342 A | | 5/1996 | Kim et al. | 359/59 |
| 5,574,582 A | | 11/1996 | Takeda et al. | 359/59 |
| 5,576,863 A | * | 11/1996 | Aoki et al. | 359/76 |
| 5,594,568 A | * | 1/1997 | Abileah et al. | 349/120 |
| 5,602,662 A | | 2/1997 | Rosenblatt et al. | 349/130 |
| 5,608,556 A | | 3/1997 | Koma | 349/143 |
| 5,621,558 A | | 4/1997 | Shimada et al. | 349/130 |
| 5,623,354 A | | 4/1997 | Lien et al. | 349/124 |
| 5,638,201 A | * | 6/1997 | Bos et al. | 349/129 |
| 5,666,179 A | | 9/1997 | Koma | 349/143 |
| 5,668,650 A | | 9/1997 | Mori et al. | 349/42 |
| 5,673,092 A | | 9/1997 | Horie et al. | 349/86 |
| 5,686,977 A | | 11/1997 | Kim et al. | 349/38 |
| 5,710,611 A | * | 1/1998 | Suzuki et al. | 349/129 |
| 5,736,067 A | * | 4/1998 | Kawata et al. | 252/299.5 |
| 5,737,051 A | | 4/1998 | Kondo et al. | 349/141 |
| 5,739,878 A | * | 4/1998 | Bae | 349/42 |
| 5,767,926 A | | 6/1998 | Kim et al. | 349/38 |
| 5,777,701 A | | 7/1998 | Zhang | 349/44 |
| 5,777,711 A | | 7/1998 | Sugiyama | 349/143 |
| 5,853,818 A | * | 12/1998 | Kwon et al. | 427/510 |
| 5,856,857 A | * | 1/1999 | Kim | 349/129 |
| 5,963,290 A | * | 10/1999 | Murai et al. | 349/191 |
| 6,067,140 A | * | 5/2000 | Woo et al. | 349/129 |
| 6,084,651 A | * | 7/2000 | Yamahara et al. | 349/118 |
| 6,091,471 A | * | 7/2000 | Kim et al. | 349/124 |
| 6,100,953 A | * | 8/2000 | Kim et al. | 349/129 |
| 6,157,428 A | * | 12/2000 | Koma | 349/138 |
| 6,222,601 B1 | * | 4/2001 | Choi et al. | 349/124 |

FOREIGN PATENT DOCUMENTS

| | | |
|---|---|---|
| EP | 0 884 626 | 12/1998 |
| GB | 2 296 810 | 7/1996 |
| GB | 2 321 718 | 8/1998 |
| GB | 2 337 843 | 12/1999 |
| JP | 4-67127 | 3/1992 |
| JP | 5-88150 A * | 4/1993 |
| JP | 05-297412 | 11/1993 |
| JP | 09-197420 | 7/1997 |
| JP | 09-230387 | 9/1997 |
| JP | 11-160710 A * | 6/1999 |
| WO | 961 0774 | 4/1996 |

OTHER PUBLICATIONS

A. Lien, R.A. John, TFT–Addressed Two–Domain TN VGA Displays Fabricated Using the Parallel Fringe Field Method, SID Digest, 1994, pp. 594–597.

N. Koma, Y. Baba, K. Matsuoka, No–Rub Multi–Domain TFT–LCD Using Surrounding–Electrode Method, SID Digest, 1995, pp. 869–872.

H. Murai, M. Suzuki, S. Kaneko, Novel High Contrast Random and Controlled 4–Domain CTN–LCDs with Wide Viewing Angle, Euro Display '96, pp. 159–161.

Y. Koike, S. Kataoka, T. Sasaki, H. Chida, H. Tsuda, A. Takeda and K. Ohmuro, T. Sasabayashi, K. Okamoto, A Vertically Aligned LCD Providing Super–High Image Quality, IDW '97, pp. 159–162.

N. Koma, R. Nishikawa, Development of a High–Quality TFT–LCD for Projection Displays, SID Digest, 1997, pp. 461–464.

K. Ohmuro, S. Kataoka, T. Sasaki, Y. Koike, Development of Super–High Image Quality Vertical Alignment Mode LCD, SID Digest, 1997, pp. 845–848.

U.S. patent application Ser. No. 09/250,262, Kim et al., filed Feb. 1999.

U.S. patent application Ser. No. 09/537,570, Kim et al., filed Mar. 2000.

U.S. patent application Ser. No. 09/256,180, Seo et al., filed Feb. 1999.

U.S. patent application Ser. No. 09/326,415, Kim et al., filed Jan. 1999.

U.S. patent application Ser. No. 09/421,114, Kim et al., filed Oct. 1999.

U.S. patent application Ser. No. 09/448,276, Lee et al., filed Nov. 1999.

U.S. patent application Ser. No. 09/497,507, Lee et al., filed Feb. 2000.

U.S. patent application Ser. No. 09/327,283, Yoo et al., filed Jan. 1999.

U.S. patent application Ser. No. 09/598,213, Kim et al., filed Jun. 2000.

U.S. patent application Ser. No. 09/357,247, Lee, Filed Jul. 1999.

U.S. patent application Ser. No. 09/541,426, Kim et al., filed Apr. 2000.

U.S. patent application Ser. No. 09/567,134, Kim et al., filed May. 2000.

U.S. patent application Ser. No. 09/618,165, Choi et al., filed Jul. 2000.

* cited by examiner

MULTI-DOMAIN LIQUID CRYSTAL DISPLAY DEVICE HAVING FIELD AFFECTING ELECTRODE

BACKGROUND OF THE INVENTION

1. Field of the Invention

The present invention relates to. a liquid crystal display device (LCD), and more particularly to a multi-domain liquid crystal display device capable distorting electric field and shielding light.

2. Description of the Related Art

Recently, a LCD has been proposed where the liquid crystal is not aligned and the liquid crystal is driven by side electrodes insulated from pixel electrodes. FIG. 1 is a sectional view of pixel unit of the conventional LCDs.

Regarding conventional LCDs, a plurality of gate bus lines arranged in a first direction on a first substrate and a plurality of data bus lines arranged in a second direction on the first substrate divide the first substrate into a plurality of pixel regions.

A thin film transistor (TFT) applies image signal delivered from the data bus line to a pixel electrode 13 on a passivation layer 4. The TFT is formed on each pixel region and comprises a gate electrode, a gate insulator, a semiconductor layer, a source electrode, and a drain electrode, etc.

Side electrode 15 is formed surrounding the pixel electrode 13 on the gate insulator, thereon passivation layer 4 is formed over the whole first substrate, and a part of pixel electrode 13 overlaps side electrode 15.

Alternatively, pixel electrode 13 is formed on the gate insulator and passivation layer 4 is formed over the whole first substrate. Afterward, side electrode 15 is formed as overlapping a part of pixel electrode 13. Moreover, it is possible to pattern the pixel electrode 13 by etching and dividing the pixel region.

On a second substrate, a common electrode 17 is formed and together with pixel electrode 13 applies electric field to a liquid crystal layer. Side electrode 15 and open area (slit) 19 distort the electric field applied to the liquid crystal layer. Then, liquid crystal molecules are variously driven in a unit pixel. Thus, when voltage is applied to the LCD, dielectric energy due to the distorted electric field arranges the liquid crystal directors in a needed position.

In the LCDs, however, open area 19 in common electrode 17 or pixel electrode 13 is necessary, and the liquid crystal molecules could be driven stably when the open area is wider. If the electrodes do not have a slit or the width of the slit is narrow, the electric field distortion needed to divide the pixel region becomes weak. Then, when voltage over a threshold voltage, $V_{th}$, is applied, the time needed to stabilize the liquid crystal directors increases.

In particular, the response time can be over 100 msec. At this time, disclination occurs from the area where the liquid crystal directors are parallel with a transmittance axis of the polarizer, which results in a decrease in brightness. Further, according to the surface state of LCDs, the liquid crystal texture has an irregular structure.

SUMMARY OF THE INVENTION

Accordingly, the present invention is directed to a LCD that substantially obviates one or more problems due to limitations and disadvantages of the related art.

An object of the present invention is to provide a LCD having a wide viewing angle from a multi-domain effect.

Another object of the present invention is to provide a LCD having high brightness by stable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other; a liquid crystal layer between the first and second substrates; a plurality of gate bus lines arranged in a first direction on the first substrate and a plurality of data bus lines arranged in a second direction on the first substrate to define a pixel region; a thin film transistor positioned at a crossing area of the data bus line and the gate bus line and comprising a gate electrode, a semiconductor layer, and source/drain electrodes; a pixel electrode in the pixel region; a field-affecting electrode on the second substrate; a color filter layer on the field affecting electrode; and a common electrode on the color filter layer.

In another aspect, the multi-domain liquid crystal display of the present invention comprises first and second substrates facing each other; a liquid crystal layer between the first and second substrates; a plurality of gate bus lines arranged in a first direction on the first substrate and a plurality of data bus lines arranged in a second direction on the first substrate to define a pixel region; a thin film transistor positioned at a crossing area of the data bus line and the gate bus line and comprising a gate electrode, a semiconductor layer, and source/drain electrodes; a pixel electrode in the pixel region; a subsidiary electrode on a the second substrate; a color filter layer on the subsidiary electrode; a common electrode on the color filter layer; and an alignment layer on at least one of the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings.

DETAILED DESCRIPTION OF THE PREFERRED EMBODIMENTS

Figure 1:
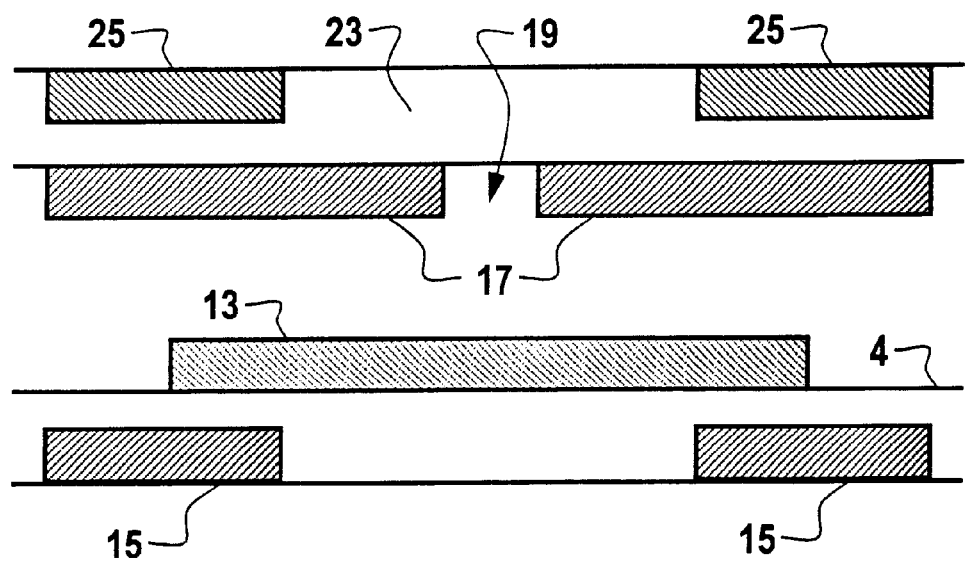
FIG. 1 is sectional view of the liquid crystal display device in the related art.
Figure 2A:
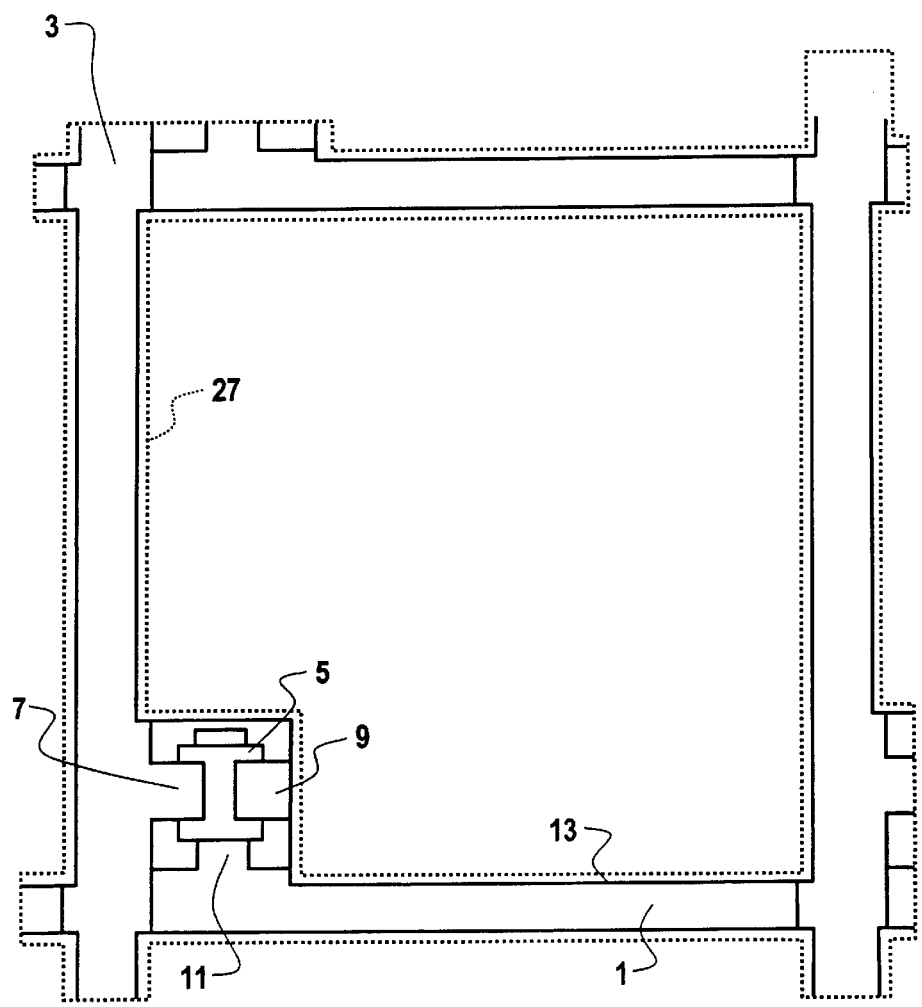
FIGS. 2A to 2E are plan views of the multi-domain liquid crystal display devices according to the embodiments of the present invention.
Figure 2B:
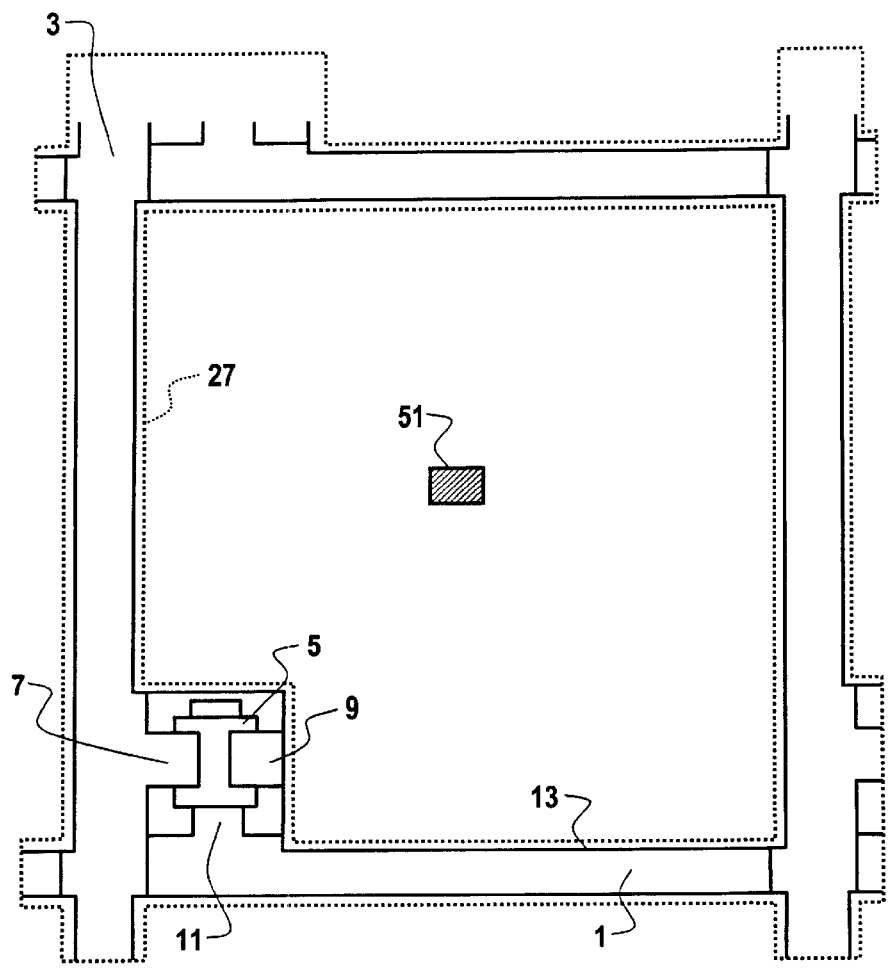
Figure 2C:
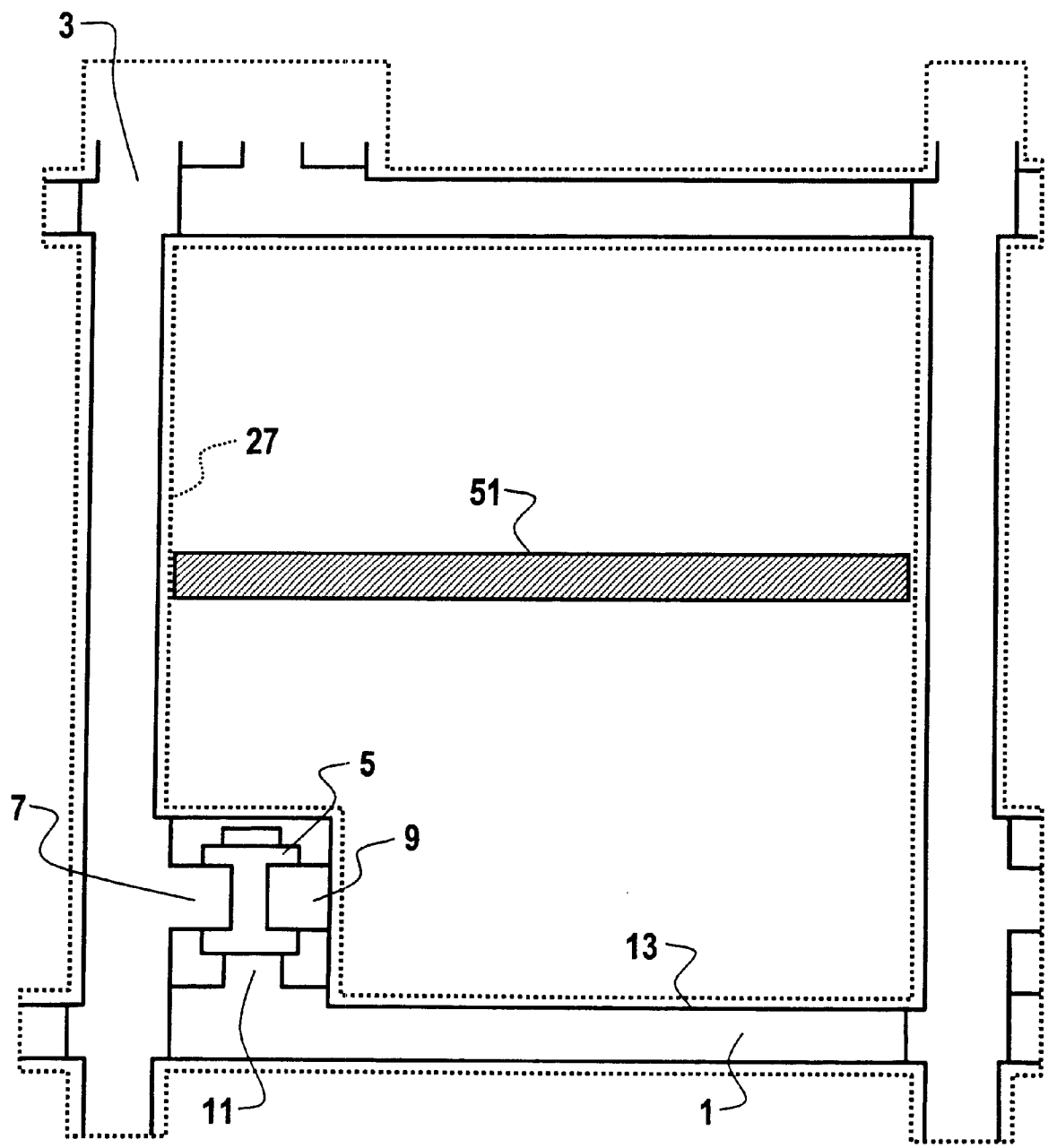
Figure 2D:
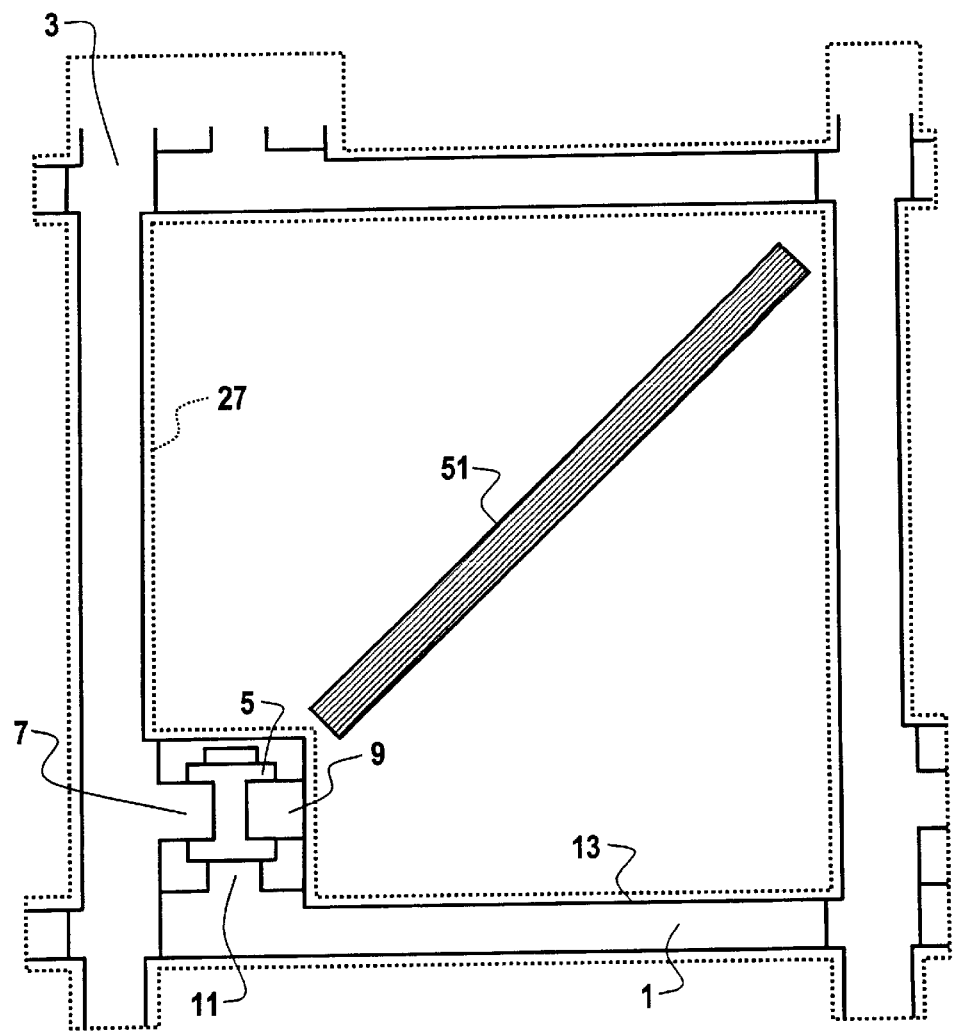
Figure 2E:
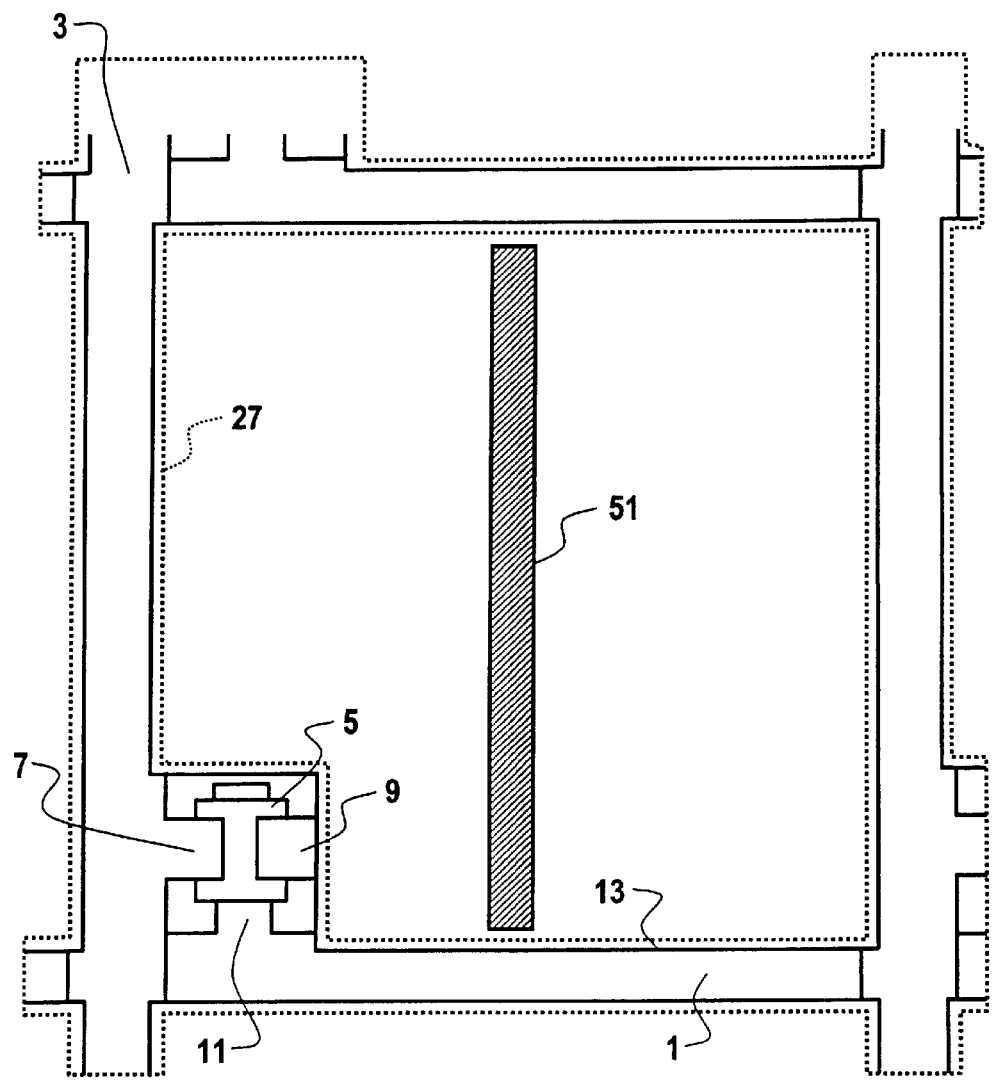
Figure 3A:
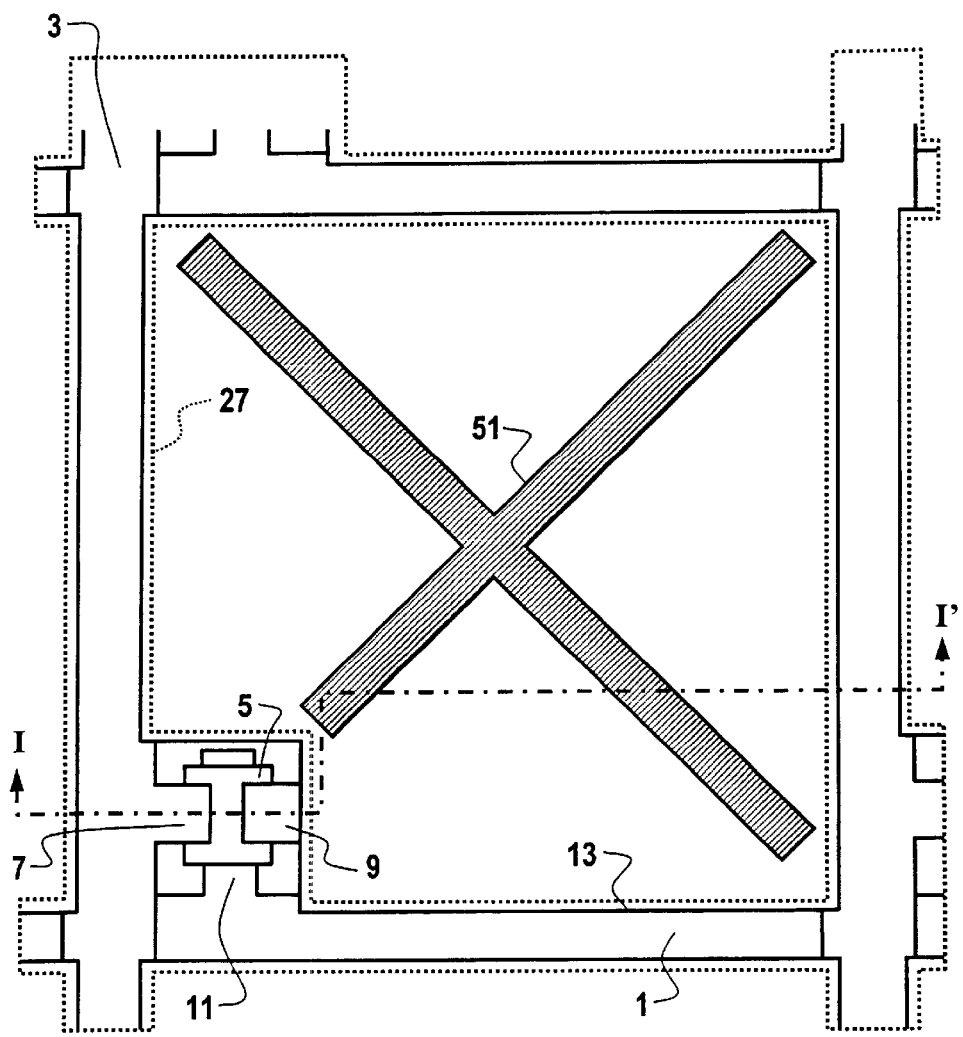
FIGS. 3A to 3H are more plan views of the multi-domain liquid crystal display devices according to the embodiments of the present invention.
Figure 3B:
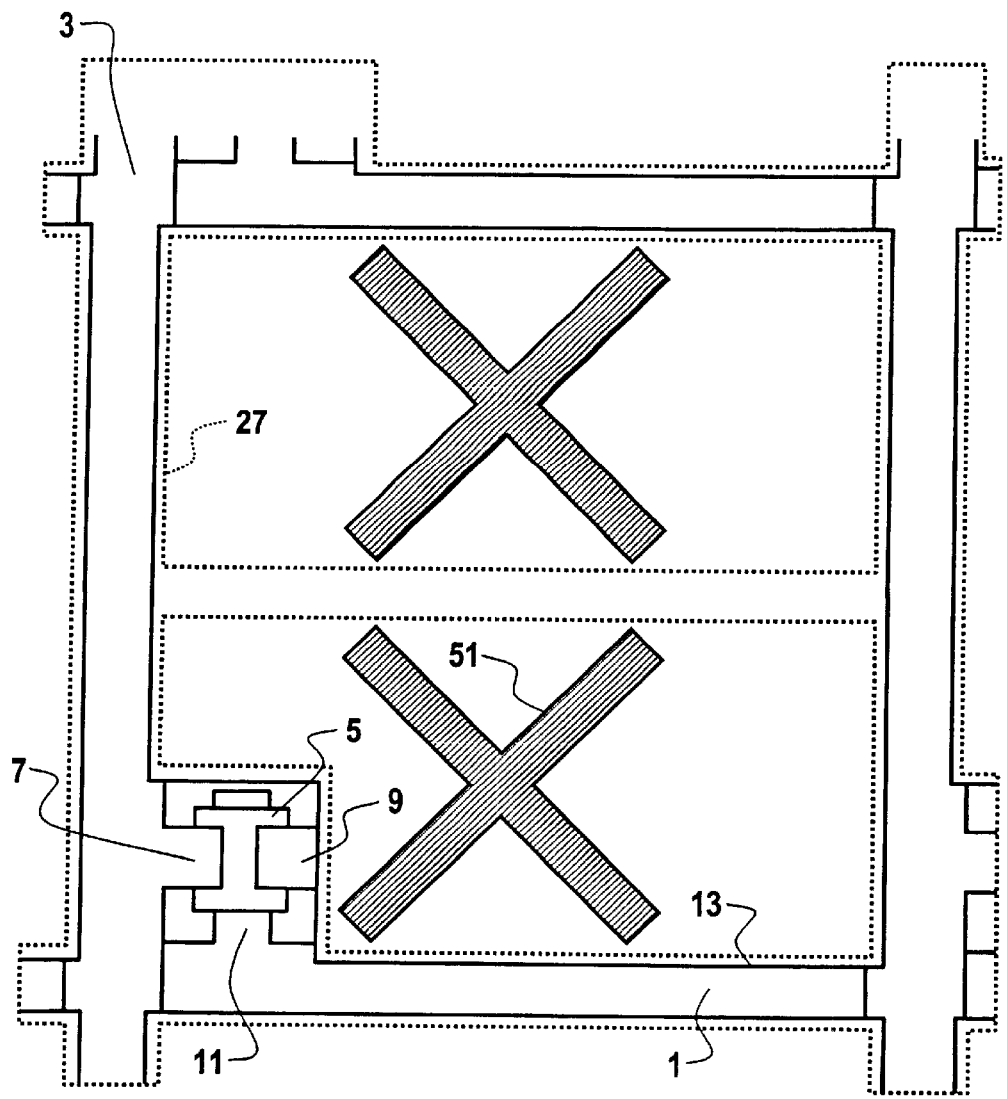
Figure 3C:
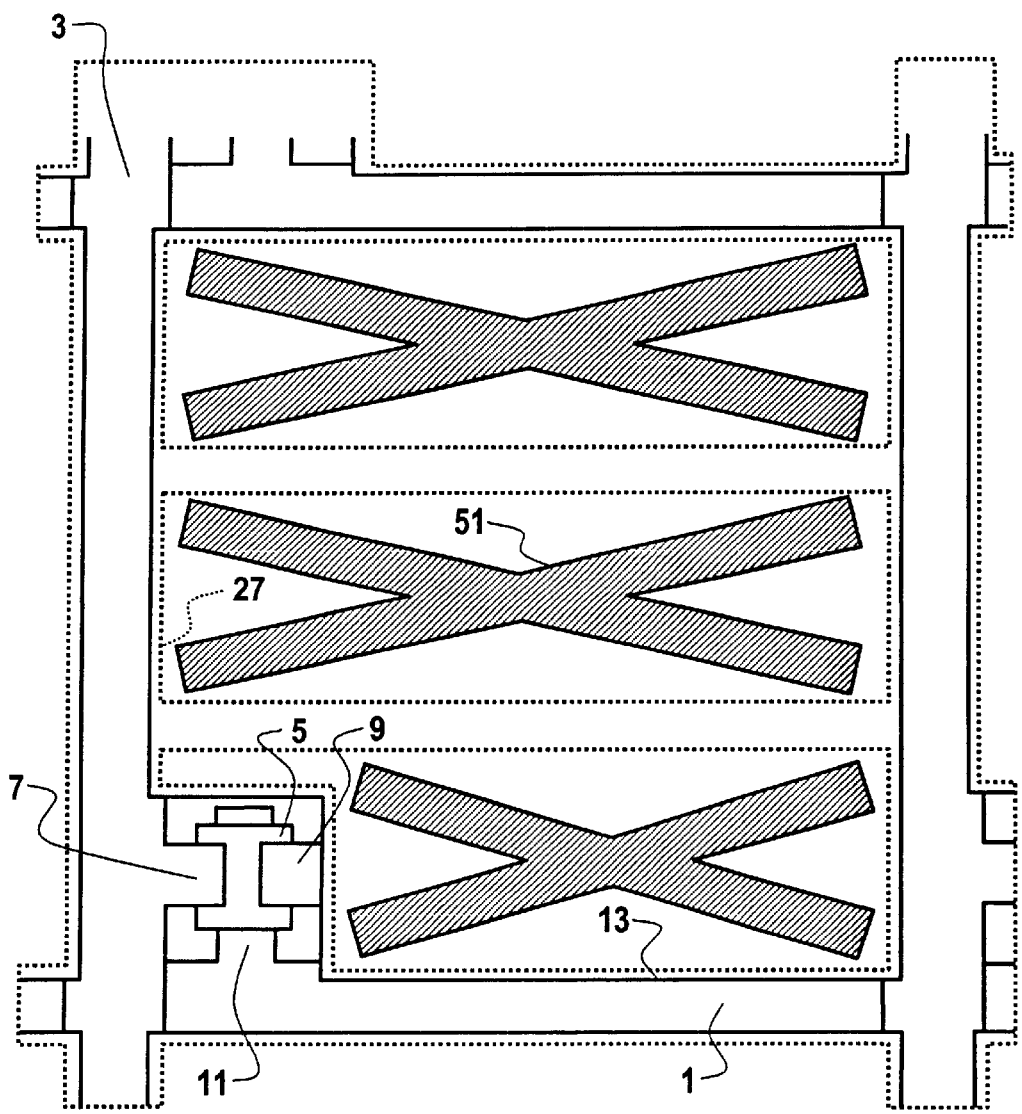
Figure 3D:
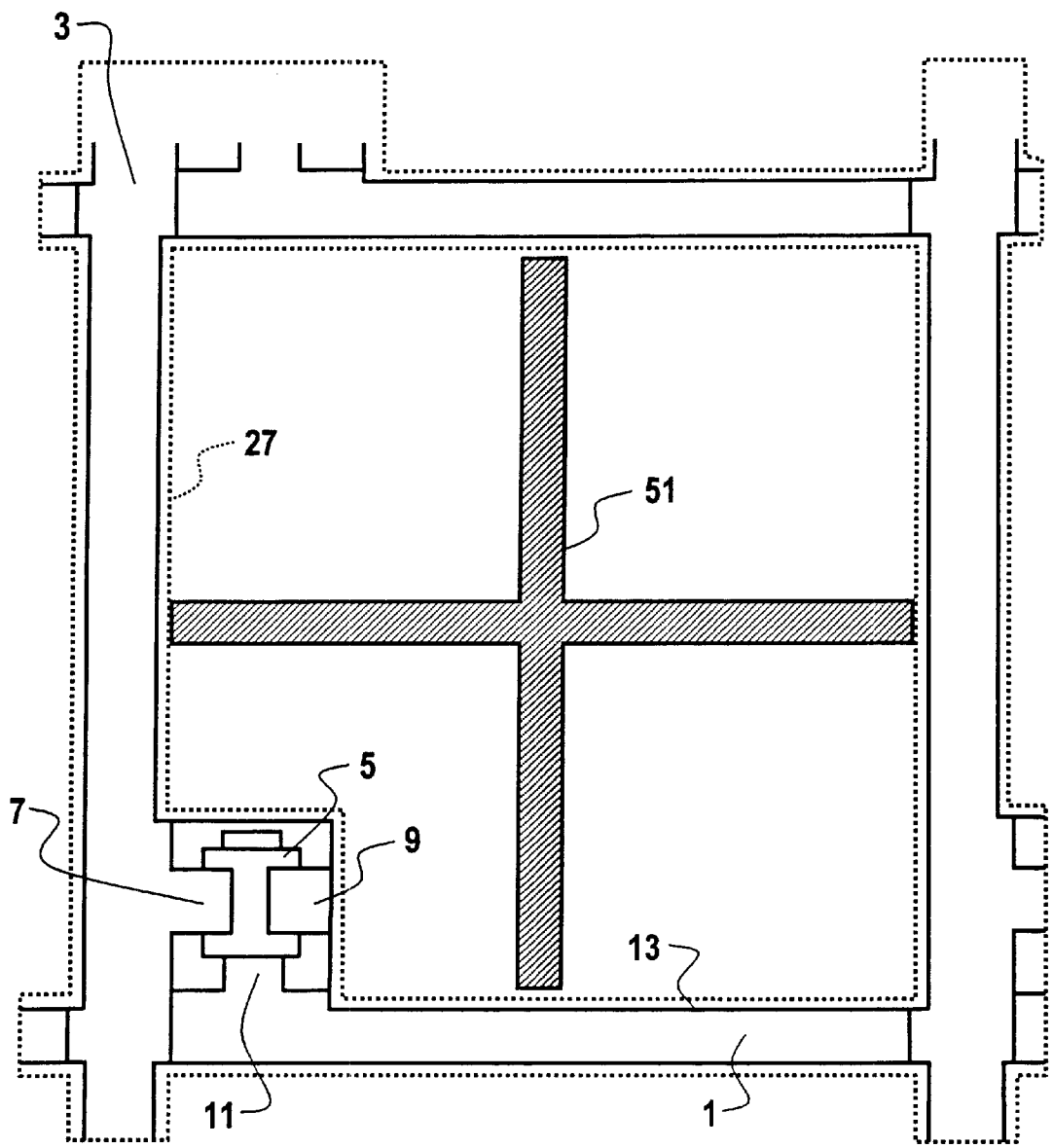
Figure 3E:
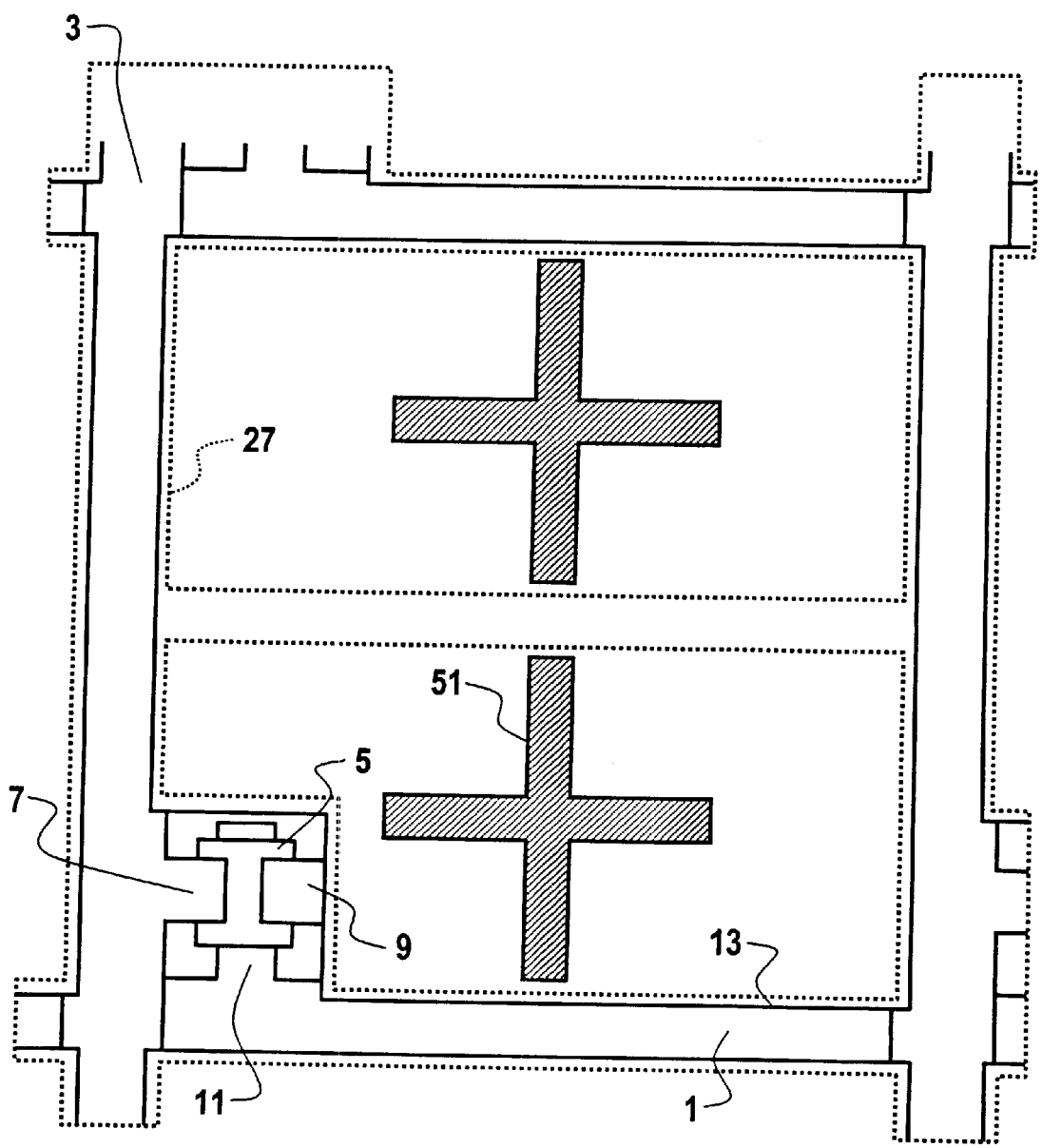
Figure 3F:
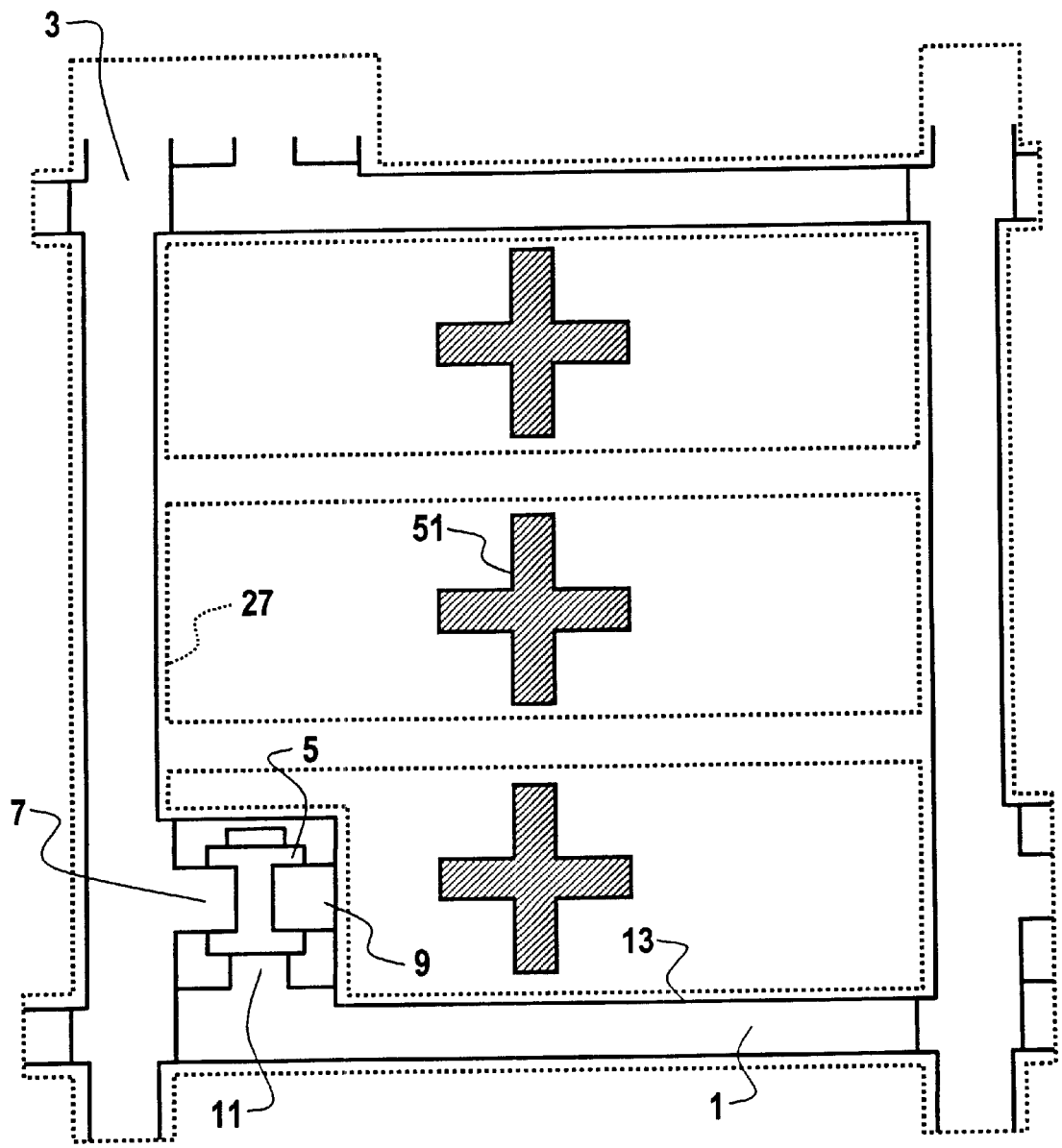
Figure 3G:
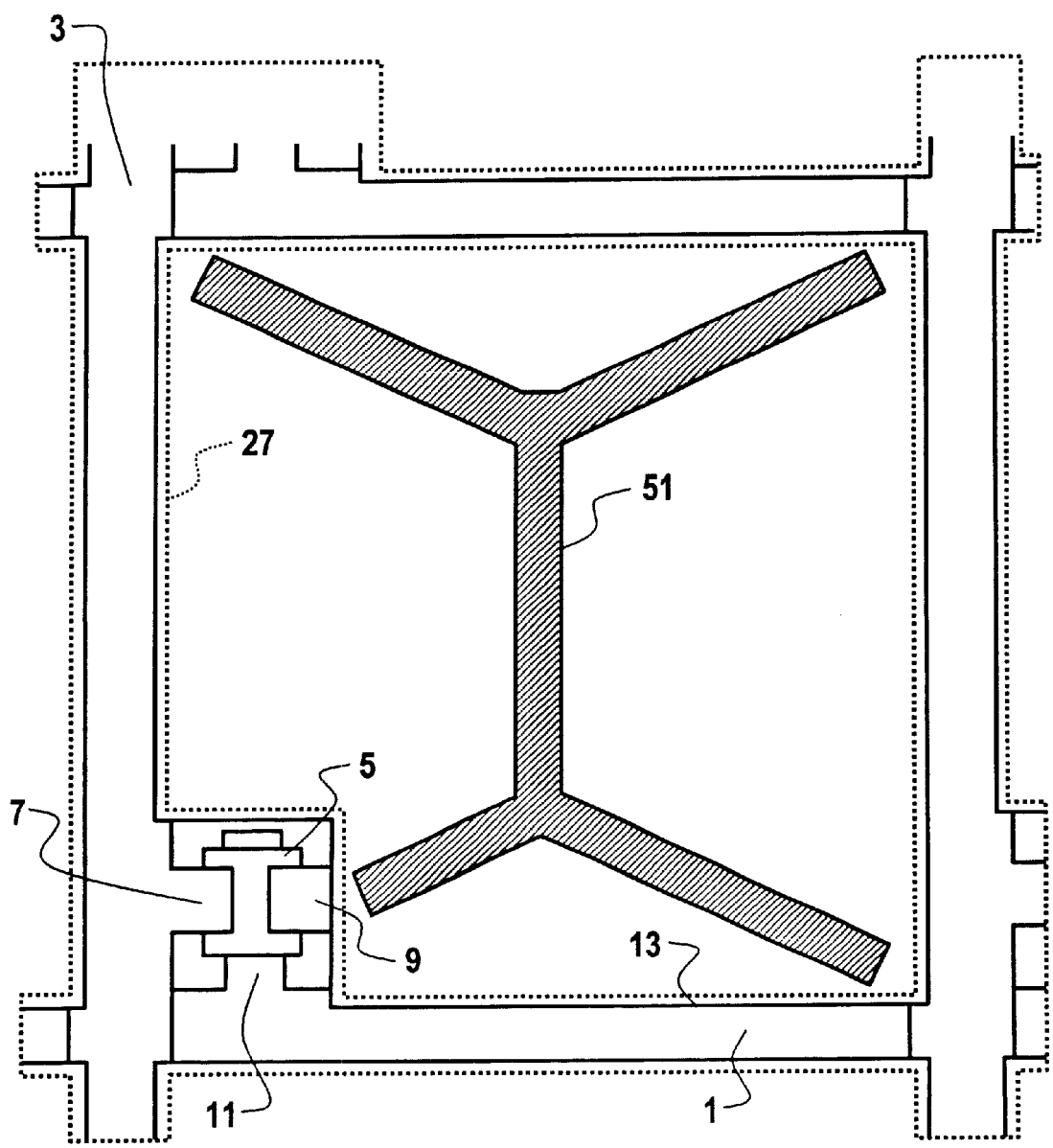
Figure 3H:
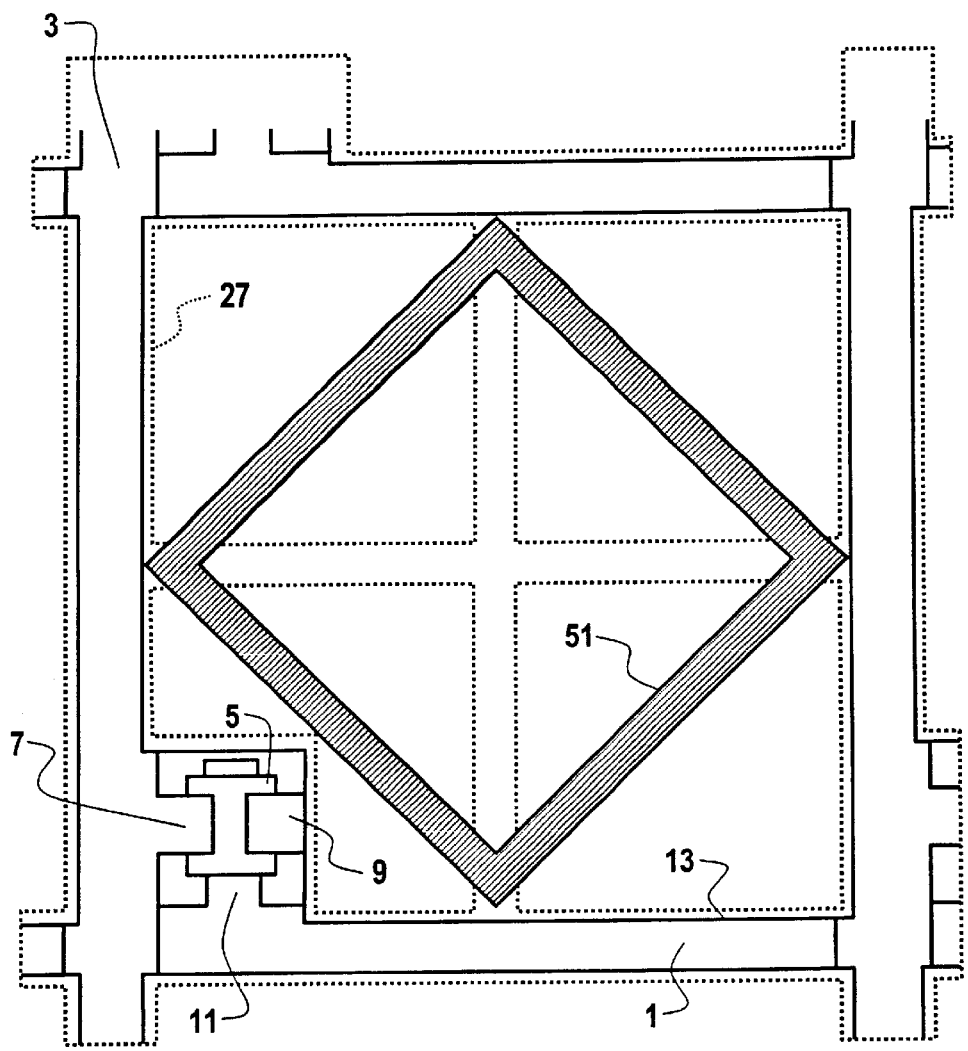

Hereinafter, the multi-domain liquid crystal display device of the present invention is explained in detail by accompanying the drawings.

FIGS. 2A to 2E and FIGS. 3A to 3H are plan views of the multi-domain liquid crystal display devices according to the embodiments of the present invention, and FIGS. 4A to 4D are sectional views of the multi-domain liquid crystal display devices according to the first, second, third, and fourth embodiments of the present invention.

Referring to the figures, the multi-domain liquid crystal display device of the present invention comprises first and second substrates 31, 33, a plurality of gate bus lines 1 arranged in a first direction on first substrate 31 and a plurality of data bus lines 3 arranged in a second direction on the first substrate, a thin film transistor (TFT), a passivation layer 37, and a pixel electrode 13.

Data bus lines 3 and gate bus lines 1 divide the first substrate into a plurality of pixel regions. The TFT comprises a gate electrode 11, a gate insulator 35, a semiconductor layer 5, an ohmic contact layer 6, and source/drain electrodes 7, 9. Passivation layer 37 is formed on the whole first substrate 31. Pixel electrode 13 is coupled to drain electrode 9 and overlapped the TFT and/or data bus lines 3, and gate bus lines 1 on passivation layer 37.

The present invention comprises a subsidiary or auxiliary electrode 27. The subsidiary electrode 27 distorts electric field. The subsidiary electrode 27 may also shields light from leaking at gate bus lines 1, data bus lines 3, and the TFT. A color filter layer 23 is on the subsidiary electrode 27, and a common electrode 17 is on the color filter layer 23. A liquid crystal layer is between first and second substrates 31, 33.

In the LCD, a passivation layer 37 may be formed to prevent a short between subsidiary electrode 27 and common electrode 17. The passivation layer 37 also prevents a decrease in the reliability due to the reaction of color filter layer 23 and the liquid crystal layer. Moreover, referred to FIG. 4B, an overcoat layer may be formed between the color filter layer 23 and the common electrode 17.

Subsidiary electrode 27 is formed preferably from a material having good conductivity, such as Cr. A voltage supply such as an operational amplifier may be used to provide amplified signals to apply voltages.

For example, for a driving voltage of 5V, pixel electrode 13 is applied with 10~5|V, common electrode 17, $V_{com}$, is at 0V, and subsidiary electrode 27 is applied with $|V_{com}-\alpha|V$. Here, $\alpha$ is preferably in a range of $0<\alpha<V_{op}$ (operating voltage), and more preferably in a range of $0<\alpha<V_{th}$ (threshold voltage).

If $\alpha$ is a large value in the given range, the potential difference between common electrode 17 and subsidiary electrode 27 is large correspondingly and the distortion effect of the electric field formed in the LCD is increased.

As an another example, for a driving voltage of 10V, pixel electrode 13 is applied with 0~10V, common electrode 17, $V_{com}$, is at 5V, and subsidiary electrode 27 is applied with $|V_{com}-\alpha|V$. Here, $\alpha$ is preferably in a range of $|5-\alpha|>0$.

If a is $\alpha$ large value in the given range, the potential difference between common electrode 17 and subsidiary electrode 27 is large correspondingly and the distortion effect of the electric field formed in the LCD is increased.

To manufacture the LCD, in each pixel region on the first substrate 31, a TFT is formed comprising gate electrode 11, gate insulator 35, semiconductor layer 5, ohmic contact layer 6 and source/drain electrodes 7, 9. A plurality of gate bus lines 1 and a plurality of data bus lines 3 are formed to divide the first substrate 31 into a plurality of pixel regions.

Gate electrode 11 and gate bus lines 1 are formed from depositing by sputtering and patterning a metal such as Al, Mo, Cr, Ta or Al alloy. Alternatively, it is possible to form the gate electrode and gate bus line as a double layer, the double layer is formed from different materials. Gate insulator 35 is formed from depositing by PECVD and patterning an insulating material such as $SiN_x$ or $SiO_x$.

Semiconductor layer 5 and the ohmic contact layer 6 are formed from depositing by PECVD (Plasma Enhancement Chemical Vapor Deposition) and patterning amorphous silicon (a-Si) and doped amorphous silicon ($n^+$ a-Si). Also, gate insulator 35, amorphous silicon (a-Si), and doped amorphous silicon ($n^+$ a-Si) are formed by PECVD and patterned. So, gate insulator 35, semiconductor layer 5, and ohmic contact layer 6 are formed.

Data bus line 3 and source/drain electrodes 7, 9 are formed by sputtering and patterning a metal such as Al, Mo, Cr, Ta, Al alloy, etc. Alternatively, it is possible to form the data bus line 3 and source/drain electrodes 7, 9 as a double layer, the double layer is formed from different materials.

Passivation layer 37 is formed with a material such as BCB (BenzoCycloButene), acrylic resin, polyimide-based material, $SiN_x$ or $SiO_x$. Pixel electrode 13 is formed by sputtering and patterning a metal such as ITO (indium tin oxide). A contact hole 39 is formed to connect the pixel electrode 13 to the drain electrode 9 and storage electrode (not shown in the figure) by opening and patterning a part of the passivation layer 37 on drain electrode 9.

Figure 4A:
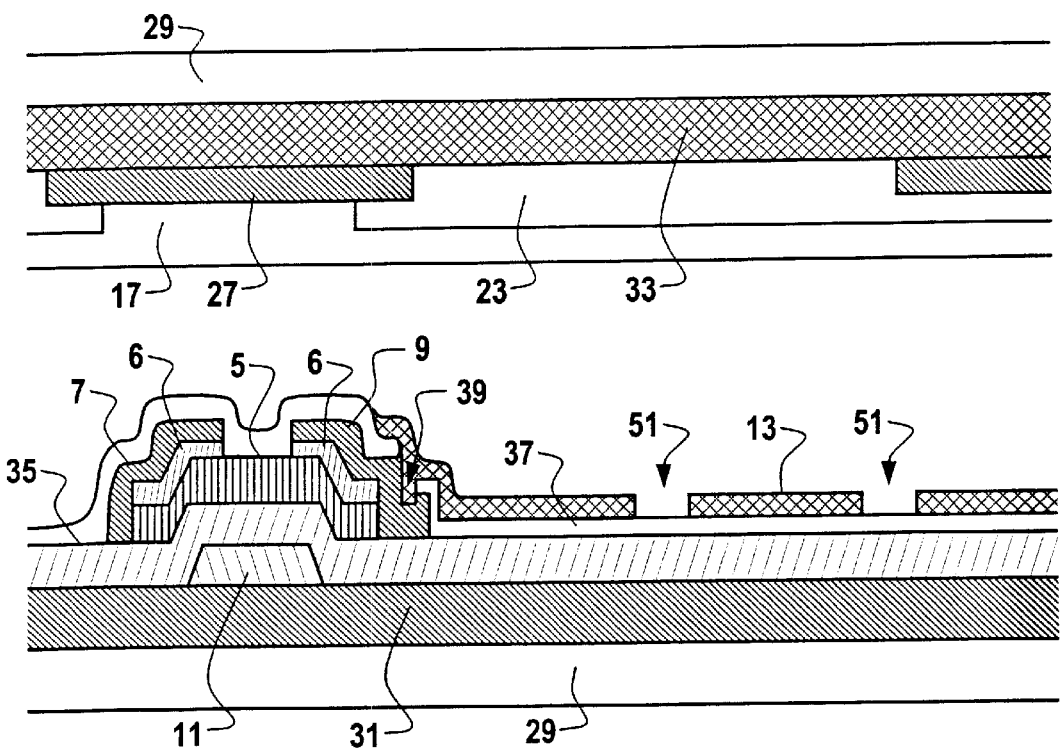
FIGS. 4A to 4D are sectional views of the multi-domain liquid crystal display devices according to the first, second, third, and fourth embodiments of the present invention.
Figure 4B:
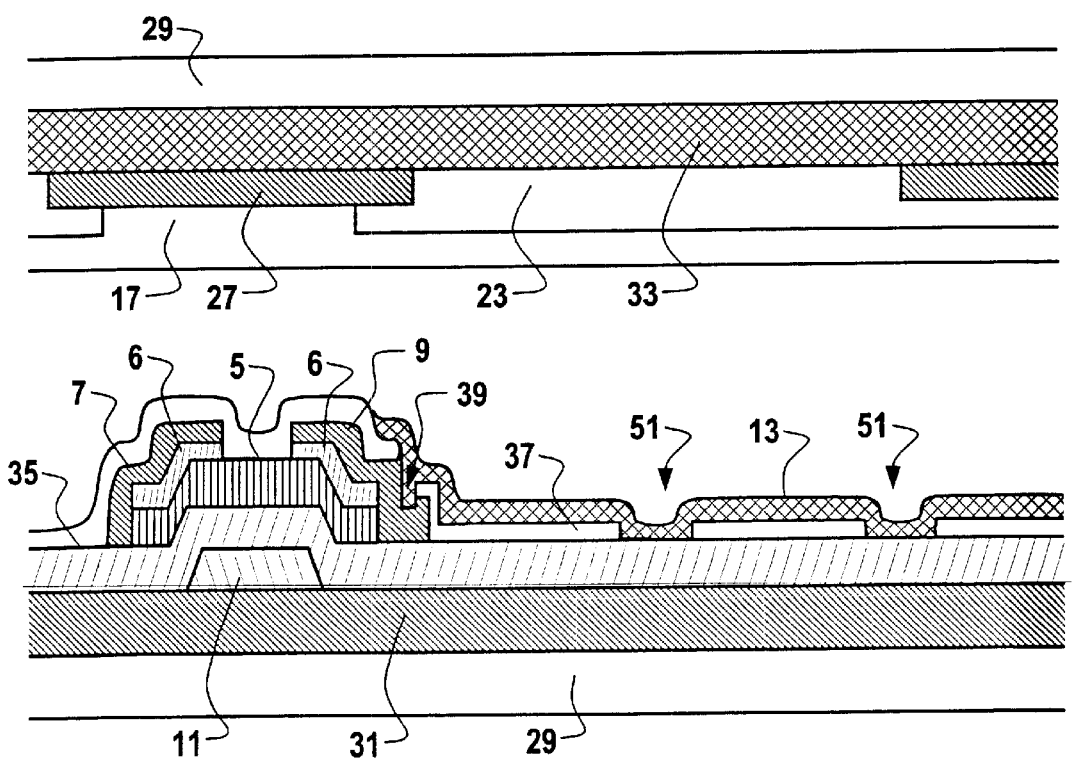
Figure 4C:
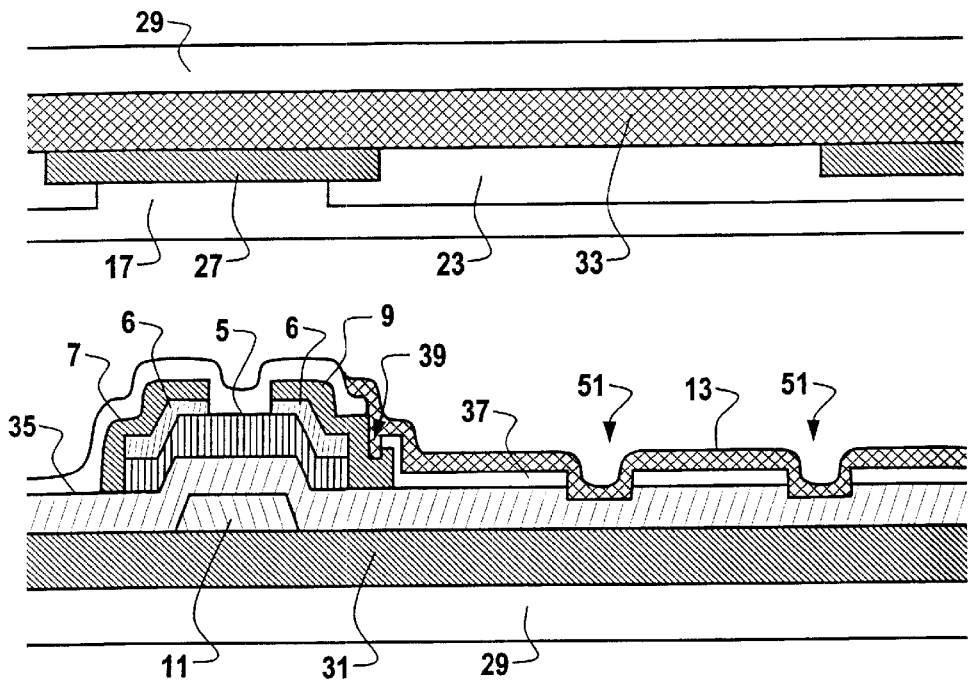
Figure 4D:
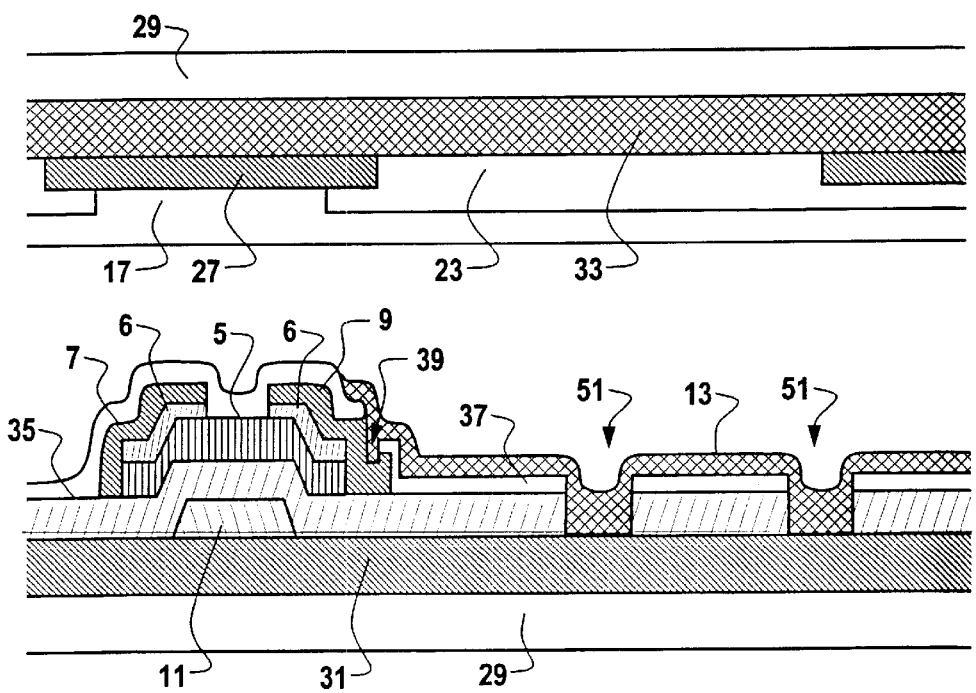

In the pixel electrode 13 or the passivation layer 37, an electric field inducing window 51 like a slit or hole is formed to distort the electric field (refer to the FIGS. 4A and 4B) The electric field inducing window 51 in FIGS. 4C and 4D may extend to the substrate 31, especially if the gate insulator 35 is performed by patterning shallowly or deeply.

Alternatively, the hole 51 (FIG. 4B) in the passivation layer 37 may be a recess that does not extend all the way to the gate insulator 35, and the hole 51 (FIG. 4C) in the passivation layer 37 and the gate insulator 35 may be a recess that does not extend all the way to the substrate 31. Moreover, source/drain electrodes 7, 9 are electrically connected to pixel electrode 13 through contact hole 39.

On second substrate 33, subsidiary electrode 27 is formed from depositing by sputtering and etching a metal. Color filter layer 23 is formed with R, G, B (Red, Green, Blue) elements repeatedly on each pixel. Subsidiary electrode 27 includes a metal having a good conductivity, and preferably Cr.

Overcoat layer 29 is formed on color filter layer 23, preferably from resin. Common electrode 17 is formed from depositing ITO by sputtering and patterning. The liquid crystal layer is formed by injecting liquid crystal between first and second substrates 31, 33. The liquid crystal layer comprises liquid crystal molecules having positive or negative dielectric anisotropy, and chiral dopants may be added thereto.

In pixel electrode 13, a multi-domain effect can be obtained by forming electric field inducing window 51 like a slit or hole. Slit is made by etching pixel electrode 13, and hole is made by etching a portion of the passivation layer or gate insulator and depositing the pixel electrode 13.

Referring to FIGS. 2A to 2E, a two-domain is obtained by dividing each pixel horizontally, vertically, and/or diagonally, respectively. Referring to FIGS. 3A to 3H, a multi-domain is obtained by dividing each pixel into four domains such as "+", "x", or double "Y" shapes. Other shapes are contemplated by the present invention for achieving multi-domain.

It is also possible to form a slit in common electrode 17 on the second substrate 33, such as shown in U.S. patent application Ser. No. 09/256,180 entitled "A MULTI-DOMAIN LIQUID CRYSTAL DISPLAY DEVICE" by Seong Moh SEO et al., and filed concurrently with this application, which is hereby incorporated by reference.

To apply voltage ($V_{com}$) to the subsidiary electrode 27, Ag-dotting part is formed in each corner of driving area on first substrate 31, electric field is applied with second substrate 33, and the liquid crystal molecules are driven by the potential difference. A voltage ($V_{com}$) is applied to subsidiary electrode 27 by connecting the Ag-dotting part to the subsidiary electrode 27, which is accomplished simultaneously by forming the subsidiary electrode 27.

On at least one substrate, a compensation film 29 is formed with polymer. The compensation film 29 is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film, which has two optical axes and wider viewing-angle characteristics as compared with the negative uniaxial film. The compensation film 29 could be formed on both substrates or on one of them.

After forming the compensation film, polarizer (not shown in the figure) is formed on at least one substrate. At this time, the compensation film and polarizer are preferably composed as one.

Figure 5:
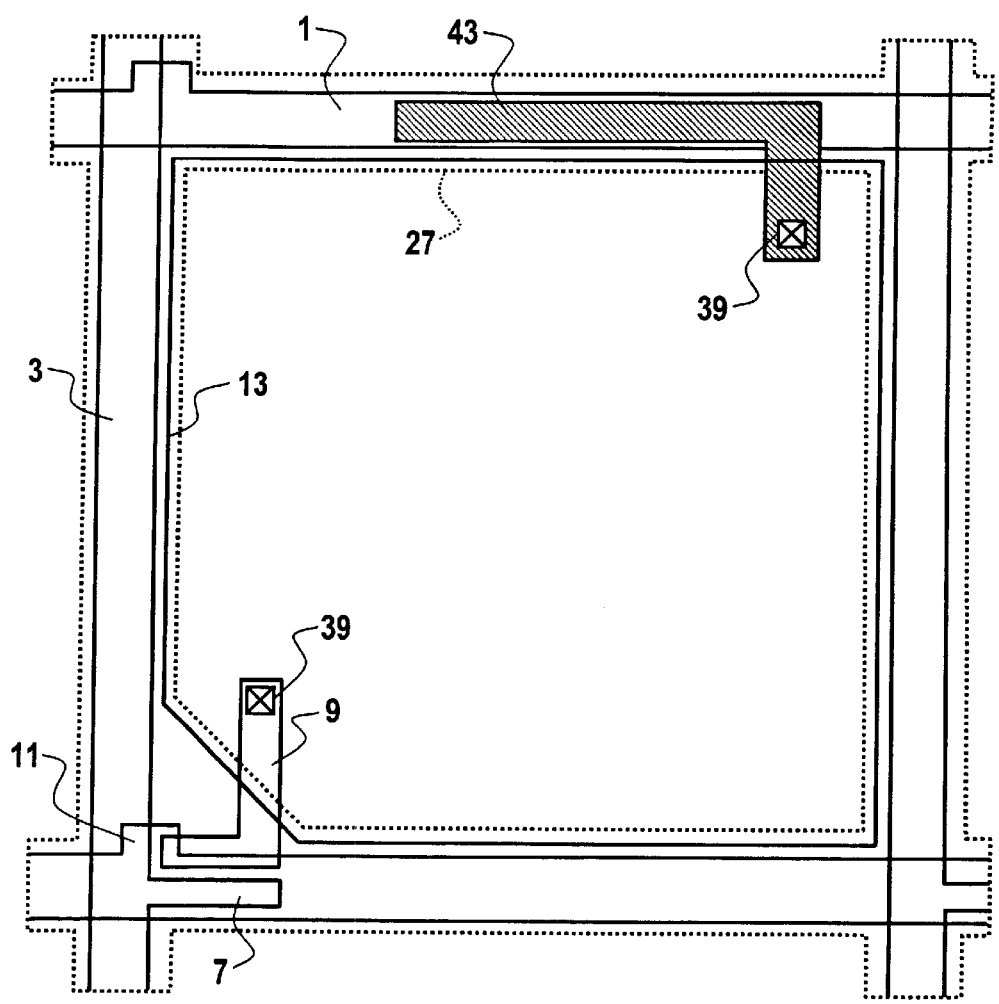
FIG. 5 is a plan view of the multi-domain liquid crystal display device according to another embodiment of the present invention.

FIG. 5 is a plan view of the multi-domain liquid crystal display device according to another embodiment of the present invention.

In the multi-domain LCD of the present invention, the aperture ratio is enhanced by an optimum structure design of a "n-line" thin film transistor (U.S. Pat. 5,694,185) so as to reduce power consumption, increase luminance, and lower reflection, thus improving contrast ratio. Aperture ratio is increased by forming the TFT above the gate line and providing a "n-line" TFT. The parasitic capacitor, occurring between the gate bus line 1 and the drain electrode 9, can be reduced when a TFT having the same channel length as the symmetrical TFT structure is manufactured due to effect of channel length extension.

Furthermore, in the present LCD, an alignment layer (not shown in the figure) is formed over the whole first and/or second substrates. The alignment layer includes a material such as polyamide or polyimide based materials, PVA (polyvinylalcohol), polyamic acid or $SiO_2$. When rubbing is used to determine an alignment direction, it should be possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for the photo-aligning treatment may be used. Irradiating light once on the alignment layer determines the alignment or pretilt direction and the pretilt angle. The light used in the photo-alignment is preferably a light in a range of ultraviolet light, and any of non-polarized light, linearly polarized light, and partially polarized light can be used.

In the rubbing or photo-alignment treatment, it is possible to apply one or both of the first and second substrates. Different aligning-treatment may be applied on each substrate.

From the aligning-treatment, a multi-domain LCD is formed with at least two domains and LC molecules of the LC layer are aligned differently one another on each domain. That is, the multi-domain is obtained by dividing each pixel into four domains such as in a "+" or "x" shape, or dividing each pixel horizontally, vertically, and/or diagonally, and differently alignment-treating or forming alignment directions on each domain and on each substrate.

It is possible to have at least one domain of the divided domains unaligned. It is also possible to have all domains unaligned.

It is possible to apply the LCD of the present invention to any alignment and mode including, for example, (1) a homogeneous alignment where liquid crystal molecules in the liquid crystal layer are aligned homogeneously to surfaces of the first and second substrates, (2) a homeotropic alignment where liquid crystal molecules in the liquid crystal layer are aligned homeotropically to surfaces of the first and second substrates, (3) a tilted alignment where liquid crystal molecules in the liquid crystal layer are aligned tiltedly to surfaces of the first and second substrates, (4) a twisted alignment where liquid crystal molecules in the liquid crystal layer are aligned twistedly to surfaces of the first and second substrates, and (5) a hybrid alignment where liquid crystal molecules in the liquid crystal layer are aligned homogeneously to surface of one substrate between the first and second substrates and are aligned homeotropically to surface of the other substrate.

Consequently, since the subsidiary electrode of the present invention is formed to distort electric field and to shield light on the upper substrate, it is possible to simplify the electrode patterning process and to ensure good aperture ratio. The distortion effect of electric field is increased by controlling the voltage of the subsidiary electrode, thus obtaining a wide-viewing angle.

Also, with aligning-treatment, a rapid response time and a stable LC structure can be obtained by the pretilt and anchoring energy produced. Moreover, the disclination is removed to improve brightness.

It will be apparent to those skilled in the art that various modifications can be made in the multi-domain liquid crystal display device of the present invention without departing from the sprit or scope of the invention. Thus, it is intended that the present invention covers the modifications and variations of this invention provided they come within the scope of the appended claims and their equivalents.

What is claimed is:

1. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a thin film transistor positioned at a crossing area of said data bus line and said gate bus line and comprising a gate electrode, a semiconductor layer and source/drain electrodes;

a pixel electrode in said pixel region;

a field-affecting electrode for having a voltage applied thereto on said second substrate;

a color filter layer on said field-affecting electrode; and a common electrode on said color filter layer;

wherein the field-affecting electrode and the common electrode distort electric field applied between said first and second substrate, and whereby the field-affecting electrode is formed surrounding said pixel region enabling a multi-domain effect within the pixel region.

2. The multi-domain liquid crystal display device according to claim 1, wherein said field-affecting electrode is located corresponding to said thin film transistor.

3. The multi-domain liquid crystal display device according to claim 1, wherein said field-affecting electrode acts as a light shielding layer.

4. The multi-domain liquid crystal display device according to claim 1, further comprising an alignment layer on at least one substrate between said first and second substrates.

5. The multi-domain liquid crystal display device according to claim 4, wherein said alignment layer is divided into at least two portions, liquid crystal molecules in said liquid crystal layer corresponding to said two portions are aligned differently from each other.

6. The multi-domain liquid crystal display device according to claim 5, wherein at least one portion of said alignment layer is alignment-treated.

7. The multi-domain liquid crystal display device according to claim 5, wherein all portions of said alignment layer portions are non-alignment-treated.

8. The multi-domain liquid crystal display device according to claim 5, wherein at least one portion of said alignment layer is rubbing-treated.

9. The multi-domain liquid crystal display device according to claim 8, wherein said alignment layer includes a material selected from the group consisting of polyimide and polyamide based materials, PVA(polyvinylalcohol), polyamic acid, and silicon dioxide.

10. The multi-domain liquid crystal display device according to claim 5, wherein at least one portion of said alignment layer is photo-alignment-treated.

11. The multi-domain liquid crystal display device according to claim 10, wherein said alignment layer includes a material selected from the group consisting of PVCN (polyvinylcinnamate), PSCN(polysiloxanecinnamate), and CelCN(cellulosecinnamate) based materials.

12. The multi-domain liquid crystal display device according to claim 10, wherein said at least one portion is photo-alignment-treated with ultraviolet light.

13. The multi-domain liquid crystal display device according to claim 10, wherein said at least one portion is photo-alignment-treated by irradiating light at least one time.

14. The multi-domain liquid crystal display device according to claim 1, further comprising an overcoat layer on said color filter layer.

15. The multi-domain liquid crystal display device according to claim 1, further comprising a gate insulator on said gate bus lines.

16. The multi-domain liquid crystal display device according to claim 15, said gate insulator has an electric field inducing window.

17. The multi-domain liquid crystal display device according to claim 1, further comprising a passivation layer below said pixel electrode.

18. The multi-domain liquid crystal display device according to claim 17, wherein said passivation layer has an electric field inducing window.

19. The multi-domain liquid crystal display device according to claim 1, wherein said pixel electrode includes a material selected from the group consisting of ITO(indium tin oxide), aluminum, and chromium.

20. The multi-domain liquid crystal display device according to claim 1, wherein said field-affecting electrode includes a metal.

21. The multi-domain liquid crystal display device according to claim 20, wherein said metal includes chromium.

22. The multi-domain liquid crystal display device according to claim 1, wherein said common electrode includes ITO(indium tin oxide).

23. The multi-domain liquid crystal display device according to claim 1, wherein said pixel region has an electric field inducing window.

24. The multi-domain liquid crystal display device according to claim 1, wherein said pixel electrode is patterned.

25. The multi-domain liquid crystal display device according to claim 1, wherein said pixel region is divided into at least two portions, liquid crystal molecules in said liquid crystal layer corresponding to said two portions are driven differently from each other.

26. The multi-domain liquid crystal display device according to claim 1, wherein said liquid crystal layer includes liquid crystal molecules having positive dielectric anisotropy.

27. The multi-domain liquid crystal display device according to claim 1, wherein said liquid crystal layer includes liquid crystal molecules having negative dielectric anisotropy.

28. The multi-domain liquid crystal display device according to claim 1, wherein said liquid crystal layer includes liquid crystal molecules having chiral dopants.

29. The multi-domain liquid crystal display device according to claim 1, further comprising:

a negative uniaxial film on at least one substrate between said first and second substrates.

30. The multi-domain liquid crystal display device according to claim 1, further comprising:

a negative biaxial film on at least one substrate between said first and second substrates.

31. The multi-domain liquid crystal display device according to claim 1, wherein said liquid crystal layer includes liquid crystal molecules aligned homogeneously to surfaces of said first and second substrates.

32. The multi-domain liquid crystal display device according to claim 1, wherein said liquid crystal layer includes liquid crystal molecules aligned homeotropically to surfaces of said first and second substrates.

33. The multi-domain liquid crystal display device according to claim 1, wherein said liquid crystal layer includes liquid crystal molecules aligned tiltedly to surfaces of said first and second substrates.

34. The multi-domain liquid crystal display device according to claim 1, wherein said liquid crystal layer includes liquid crystal molecules aligned twistedly to surfaces of said first and second substrates.

35. The multi-domain liquid crystal display device according to claim 1, wherein said liquid crystal layer includes liquid crystal molecules aligned homogeneously to a surface of one of said first and second substrates and are aligned homeotropically to a surface of the other of said first and second substrates.

36. A multi-domain liquid crystal display device comprising:
- first and second substrates facing each other;
- data bus lines crossing on said first substrate;
- a pixel electrode on said first substrate;
- gate bus lines crossing said data bus lines to define a pixel region;
- a light shielding subsidiary electrode for having a voltage applied thereto on said second substrate;
- a common electrode on said light shielding subsidiary electrode;
- wherein the light shielding subsidiary electrode and the common electrode distort electric field applied between said first and second substrate, and whereby the light shielding subsidiary electrode is formed surrounding said pixel region enabling a multi-domain effect within the pixel region.

37. The multi-domain liquid crystal display device according to claim 36, further comprising an n-line thin film transistor at a crossing area of said gate and data bus lines.

38. The multi-domain liquid crystal display device according to claim 36, further comprising a gate insulator and a passivation layer on said first substrate.

39. The multi-domain liquid crystal display device according to claim 38, wherein said gate insulator has an electric field inducing window.

40. The multi-domain liquid crystal display device according to claim 38, wherein said passivation layer has an electric field inducing window.

* * * * *